H. B. WHITE.
HAMMER.
APPLICATION FILED MAR. 21, 1908.
1,061,512.
Patented May 13, 1913.
2 SHEETS—SHEET 1.
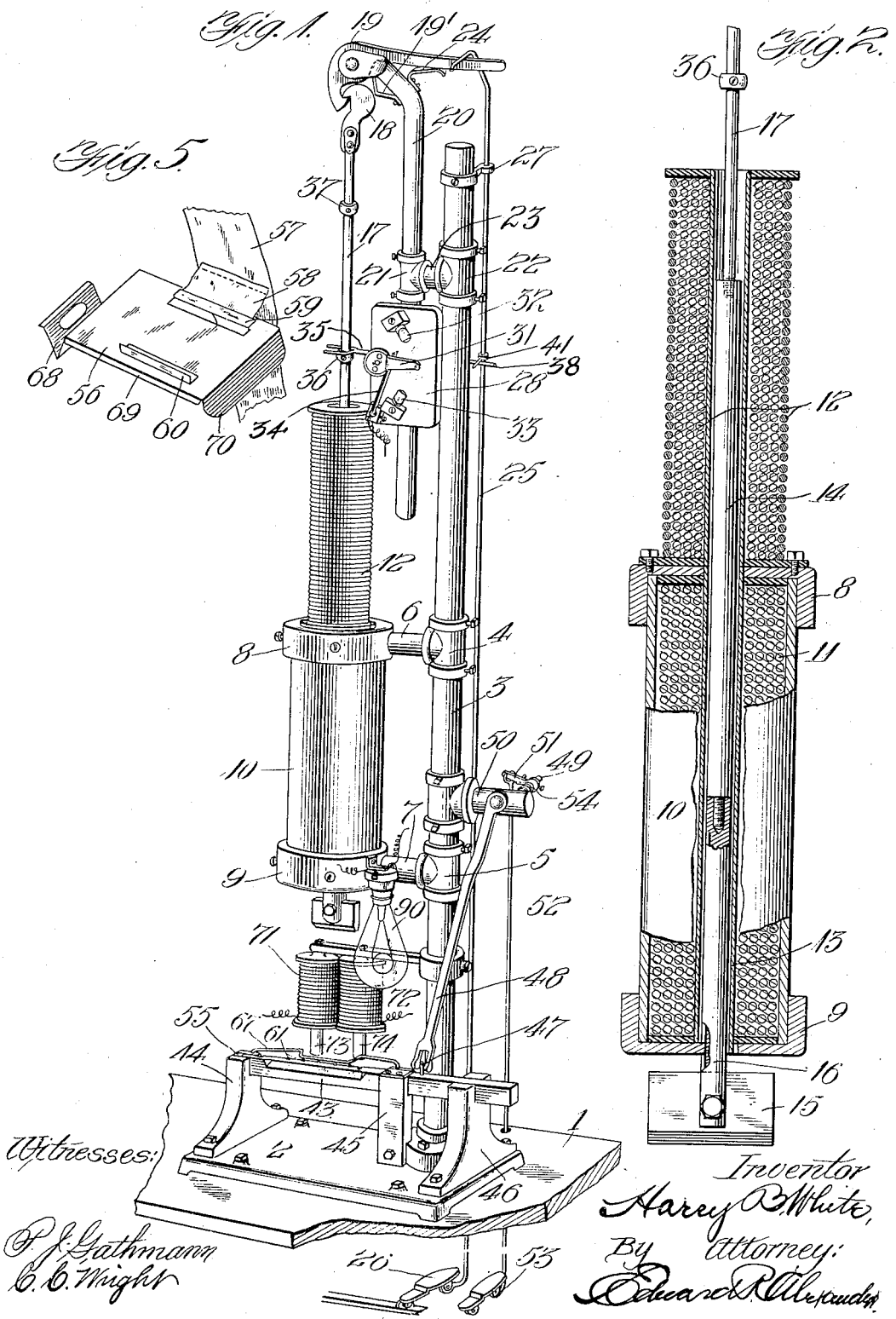
Witnesses:
P. J. Gathmann
C. C. Wright
Inventor
Harry B. White,
By Attorney:
Edward R. Alexander H. B. WHITE.
HAMMER.
APPLICATION FILED MAR. 21, 1908.
1,061,512.
Patented May 13, 1913.
2 SHEETS—SHEET 2.
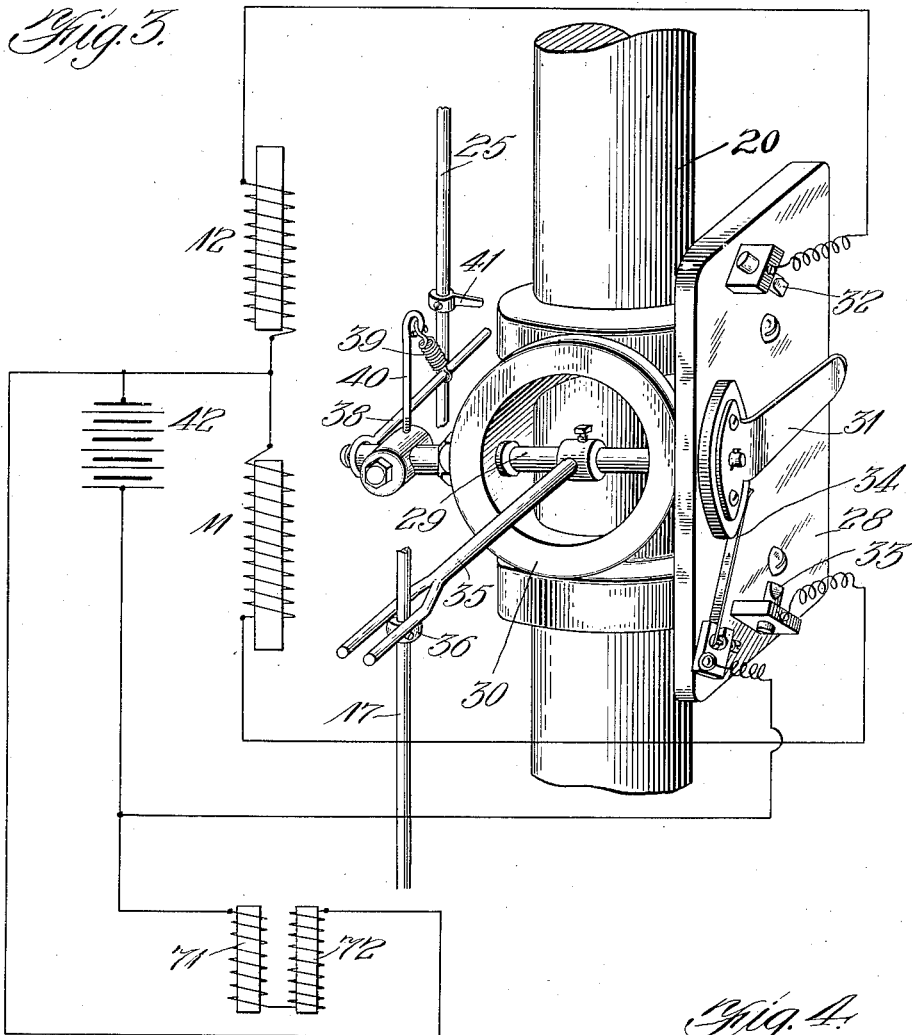
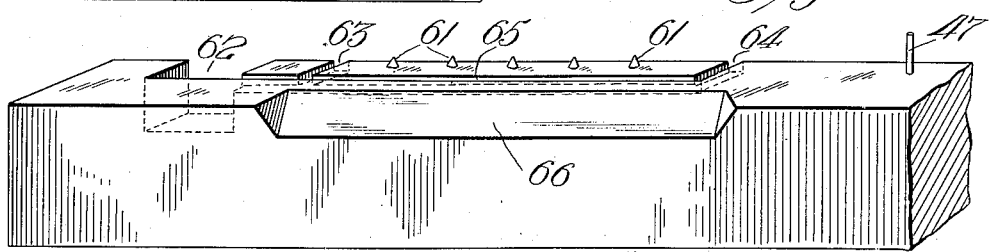
Witnesses:
Paul J. Gathmann
C. C. Wright
Inventor
Harry B. White,
By Attorney
Edward R. Alexander

UNITED STATES PATENT OFFICE.

HARRY B. WHITE, OF CANTON, OHIO.

HAMMER.

1,061,512.   Specification of Letters Patent.   Patented May 13, 1913.

Application filed March 21, 1908. Serial No. 422,411.

*To all whom it may concern:*

Be it known that I, HARRY B. WHITE, a citizen of the United States, residing at Canton, in the county of Stark and State of Ohio, have invented certain new and useful Improvements in Hammers, of which the following is a specification, reference being had therein to the accompanying drawings.

The present invention relates to electrically operated mechanism for reciprocating tools, and particularly tools of the "drop" type such as power hammers or drop forging mechanism in which the hammer or "drop" is raised and sustained against gravity and upon being released the working stroke is performed, the reciprocating part being acted upon by gravity. The invention may also be applied to the operation of drills or punches and it may have other applications.

The invention is not limited in all of its details to a gravity influenced mechanism adapted to be sustained in its raised position, as before referred to. On the contrary, various features of the invention are applicable to a wide variety of apparatus.

One object of the invention is to provide apparatus of the character described with means for regulating the working stroke.

A further object of the invention is to provide electrical switching mechanism, for controlling the operation of the reciprocating part, the said mechanism being controlled by the releasing mechanism for the said part.

A further object of the invention is to provide electrical switching apparatus for controlling the reciprocating part, said apparatus being controlled by both the reciprocating part and its releasing mechanism.

Other objects of the invention will appear hereinafter.

In the accompanying drawings, which illustrate the invention, Figure 1 is a perspective view of apparatus embodying the invention; Fig. 2 is, for the most part, a vertical axial section of the electrical operating means for the reciprocating part, the magnetic casing for the lower solenoid being partially shown in side elevation but being broken away to show the plunger which in turn is partially shown in section so that the manner of connecting the magnetic plunger with the remainder of the reciprocating part is shown; Fig. 3 is an enlarged perspective view of the working mechanism for controlling the reciprocating part, this mechanism being shown in conjunction with adjacent parts and the electrical connections being diagrammatically shown; Fig. 4 is a perspective view of a portion of the block or anvil which is employed in connection with an article as shown in Fig. 5; Fig. 5 is a perspective view of the article referred to; and, Fig. 6 is a perspective view of a detail of the block or anvil.

Referring to the drawings, upon any suitable support or floor 1 is mounted the base 2 of the mechanism. From this base extends the vertical standard 3. Upon this standard are sleeves 4 and 5 which are conveniently T-shaped pipe couplings fitted with set screws as shown for securing them in suitable positions upon the standard. Extending from the sides of the sleeves 4 and 5 are the arms 6 and 7, which may conveniently be straight pipe connections having their ends screwed into the T pipe couplings. At their ends opposite the couplings referred to, the arms 6 and 7 carry rings 8 and 9 each of which is flanged at one side and between which extends a magnetic shell or casing 10 which contains a suitably insulated magnetic coil 11. The rings 8 and 9 are also preferably of magnetic material as well as the casing 10 and these rings overlap the ends of the coil. This, it will be seen (see particularly Fig. 2) provides a complete exterior magnetic circuit of iron for the magnet coil thereby greatly increasing the effect of the coil for a given number of ampère turns. Coaxial with the magnet 11 and mounted above the same is a second magnet coil 12. A sleeve 13, preferably of non-magnetic material, extends centrally through the coils and within this sleeve slides the plunger 14 which is acted upon by the coil 12 to raise or retract the reciprocating part, and is acted upon by the coil 11 during its working stroke. The plunger 14 is, of course, of magnetic material and is joined to the reciprocating tool 15 by means of a non-magnetic rod 16 (which may be of brass) which at one end is secured to the end of the plunger and at the other end is secured to the tool.

To the top of the plunger is secured a rod 17, which, at its upper end, carries a hook 18 adapted to be engaged by a pivoted catch

19 supported by the standard 3 through the instrumentality of a bar 20 sliding in a T coupling 21 (in which it is secured by set screws as shown) which coupling is connected with a similar coupling 22 upon the standard 3 by means of a straight pipe section 23, the pipe coupling 22 being secured upon the standard by means of the set screws as shown. It will, of course, be understood, that other suitable forms of support might be employed.

A spring 24 tends to hold the catch 19 in position to engage the hook 18 and a bracket 19' upon the bar 20 serves to guide the hook 18 into position to be engaged. The catch is moved to disengage the hook 18 and release the reciprocating part by means of a rod 25 which, at its upper end, engages the tail of the catch 19 and at its lower end is pivotally secured to the treadle 26 so that when the treadle is depressed the reciprocating part will be released. A suitable guide 27 for the rod 25 is secured to the standard 3 at its upper end. Suitable guides for this rod may be added or omitted as circumstances may dictate. For controlling the electrical apparatus a switch plate 28 is supported upon the bar 20. Of course, it might be supported in any other suitable manner. A rock shaft 29 is supported in a T-coupling 30 secured upon the bar 20 (see Fig. 3). To one end of this rock shaft is secured a switch arm 31 which moves over the face of the plate 28 as the shaft 29 is rocked, and which at one end of its travel is adapted to engage and form electrical contact with the stationary terminal 32 and at the other end of its travel it is adapted to engage and form electrical contact with the terminal 33. A continuous electrical connection with the arm 31 is maintained during its movement by means of a brush 34 which is fixed upon the plate 28 and bears at one end upon the hub of the arm 31. It will, of course, be understood that the switch arm and its hub, and the various contacts are suitably insulated. Fixed to the rock shaft 29 is an arm 35 which is forked at one end so as to embrace the rod 17. Upon the rod 17 are slidingly adjustable tappets 36 and 37 adapted to engage with the forked end of the arm 35 and rock the shaft 29 as the bar 17 is moved to and fro with the reciprocating part. Also extending from the shaft 29 is an arm 38. This arm, however, is not rigidly fixed to the shaft but is pivoted at one end thereon and secured thereto by means of a spring 39 and screw-eye 40 which is fixed to the rock shaft. The end of the arm 38 extends into the path of a tappet 41 which is slidingly adjustably mounted upon the rod 25 so that the shaft 29 is rocked when the rod 25 is operated, the flexible connection between the rock shaft and the arm 38 preventing any shock or breakage of the parts in case the rod 25, which is manually operated, should be inaccurately or violently moved.

Referring particularly to Fig. 3, the source of electrical supply is shown as a battery 42 one terminal of which is connected to an end of each of the magnet coils 11 and 12. One end of the magnet coil 11 is connected with the terminal 33 and one terminal of the magnet 12 is connected with the terminal 32. The other terminal of the battery 42 is connected to the brush 34 and consequently to the switch arm 31. It will, therefore, be apparent, that when the switch arm 31 is in engagement with the terminal 32, the magnet coil 12 will be energized and the reciprocating part will be raised. It will also be seen that when the switch arm is in engagement with the terminal 33 the magnet coil 11 will be energized and tend to throw the reciprocating part toward the anvil. When the switch arm is in intermediate position, that is, not in engagement with either of the terminals 32 and 33, neither of the magnet coils 11 or 12 will be energized. Beneath the reciprocating part is the anvil 43 slidably mounted in the supports 44, 45 and 46 which are mounted upon the base 2 and have slots in their tops for receiving the anvil. To accomplish the sliding of the anvil a pin 47 is fixed in the anvil and extends within the bifurcated end of the arm 48 which is fixed to a rock shaft 49 mounted in the arm 50 upon the standard 3. This arm may be adjustable and constructed of piping parts in a manner similar to the supports for the magnets, etc., as before referred to. Fixed to the shaft 49 is an arm 51 which, at one end, is pivotally secured to a rod 52 which extends downwardly and, at its lower end, is pivoted to the treadle 53. The treadles 53 and 26 are preferably located beneath the floor as shown. The spring 54 encircling the shaft 49 and engaging the arm 50 at one end and the arm 51 at the other, tends to hold the rod 52 and arm 51 in elevated position and the anvil or block beneath the reciprocating tool. The bifurcation in the end of the arm 48 is made of such proportions as to allow considerable clearance between it and the pin so that lost motion between the anvil and arm is permitted. A stop 55 in the slot of the support 44 operates to limit the travel of the anvil and to indicate to the operator when the anvil is in working position.

In the particular apparatus shown in the drawings, the tool 15 is a hammer-head, and the anvil 43 with which it coöperates is of special construction to suit a particular purpose. The particular purpose in view is to secure trays such as that indicated by the reference numeral 56 in Fig. 5, to a pair of strips, one on each side, of textile material such as canvas. Such a strip is indicated by the numeral 57 to which the tray is secured by means of a tab 58 of canvas or other suitable material. One side of this tab is sewed to this strip 57 while the other end of the tab is secured to the tray by bending over a lip 59 upon the edge of the tab and punching depressions in the tray so that the projections thereby formed will enter the tab and secure it firmly to the tray. It may here be stated that the trays, such as 56, are stamped from sheet metal, preferably iron, and a lip as 60 is punched up on each side of the tray, this being the condition of the tray when it is presented to the apparatus shown in Fig. 1 for the purpose of securing it to the flexible strips. These trays are used in connection with a credit account system, a series of them being flexibly supported between strips 57 by tabs 58.

The special form of anvil shown has a plurality of sharpened projections 61 upon its face (see particularly Figs. 4 and 6), these projections being removably and adjustably secured in the face of the anvil so that they may be adjusted as to height as they become worn or may be removed and new ones replaced in case breakage occurs. The connections referred to may be accomplished by means of screw threads upon the lower ends of the projections, as shown in Fig. 6, which engage in screw threaded sockets in the anvil. The anvil is also provided with three parallel slots 62, 63 and 64, which open at one side of the anvil, the slots 63 and 64 being comparatively narrow while the slot 62 is comparatively wide. Running at right angles to the slots just referred to is another comparatively narrow slot 65. The purpose of these slots will appear hereinafter. The upper corner of the anvil opposite the side at which the slots open is beveled, as shown at 66, to prevent injury to the fingers of the operator in inserting or removing the trays. Upon the opposite side of the anvil from the beveled corner 66, when the anvil is in working position, is a wire guard 67 carried by the supports 44 and 45, this wire being for the purpose of preventing the operator's fingers from getting into a dangerous position from this side.

In placing the tray, prepared as described, upon the anvil, it may be laid upon the anvil face with the V shaped end 68 in the slot 62, the lateral lip 69 in the slot 65 and the end 70 in the slot 64. The bottom of the tray will then rest upon the anvil with the projections 61 bearing upon it to one side of the lip 60. A tab, as 58, having been placed close up to lip 60 and behind the same, when the hammer descends the lip will be bent down upon the end of the tab while the projections 61 will produce indentations thereby securely clamping the tab to the tray and even forcing the material of the tray through the body of the tab. One side of the tray having been thus secured the tray is turned end for end. The lip upon the other side of the tray which corresponds to the lip 69 is placed in the slot 65. The end 68 which does not extend the full width of the tray will hang outside the anvil. The end 70 will take into the slot 63. It will be observed that the points at which the tabs are attached are nearer to the end 70 of the tray than to the other end. When, therefore, the tray is reversed if the end 70 were placed within the slot 62 the tray would not be properly positioned with relation to the anvil. It is, therefore, necessary to provide the slot 63 to accommodate the end 70. The tray having been turned end for end and placed upon the anvil, as described, a tab is placed in position, as before indicated, and is secured by a blow of the hammer. In Fig. 5, upon that side of the tray where the flexible strip appears, the tab is shown as connected to the tray by reason of having passed through the operation just described.

To secure the tray in proper position upon the anvil, after it has been placed, an electro-magnetic means is provided which is shown as consisting of electro-magnets 71 and 72 having poles 73 and 74, the coils of the electro-magnet being connected across a suitable source of supply, as the battery 42 (see Fig. 3). These magnets are shown as supported from the standard 3 in suitable position to hold the tray properly upon the anvil by attraction which they exert upon the iron composing the tray.

The operation of the mechanism may be set forth as follows: In its normal position the reciprocating part carrying the hammer-head 15 is latched in its retracted position, that is, in its position away from the work, as shown in Fig. 1. The tray having been placed in position the treadle 26 is depressed thereby releasing the hammer-head and also moving the contact arm 31 into engagement with the terminal 33 thereby completing the circuit of the magnet coil 11. The hammer-head is therefore not only impelled toward the anvil by gravity but by a force, which may be made any desired by properly proportioning the magnet, is added to that of gravity in projecting the hammer toward the anvil, this movement of the hammer toward the anvil being its working stroke. Under these forces the hammer-head delivers its blow and at the same instant the tappet 37 engages the arm 35 and throws the switch arm 31 against the terminal 32. The circuit of the magnet coil 12 being thus closed the plunger is attracted upwardly and the hook 18 is engaged by the catch 19 so that the reciprocating part is sustained in its raised position. Near the end of the upward stroke of the reciprocating part the tappet 36 comes against the bifurcated end of the arm 35 and throws the switch arm 31 into an intermediate position, as shown in Fig. 1, thereby opening the circuit of the coil 12 and leaving both coils 11 and 12 open circuited. The operator may now press the treadle 53 when the anvil will be slid from beneath the hammer and the work may be removed or readjusted thereon. The material having been properly adjusted upon the anvil the treadle may be released when the anvil will move under the influence of the spring 54, back beneath the hammer when the apparatus may be operated as before.

To secure proper light upon the work an incandescent electric lamp 90 may be supported from the apparatus as shown in Fig. 1.

What I claim is:—

1. In an apparatus of the character described, the combination of a normally inactive magnet coil and an armature therefor, a reciprocating part to which said armature is connected, a releasable device for engaging and holding said part in retracted position, manual means for releasing said holding device, and means for closing the circuit for the magnet coil after the said part has been released from the holding device for effecting its working stroke.

2. In an apparatus of the character described, the combination of a normally inactive magnet coil and an armature therefor, a reciprocating part to which said armature is connected, a releasable device for engaging and holding said part in retracted position, manual means for releasing said holding device, and means for closing the circuit for the magnet coil after the said part has been released from the holding device for effecting its working stroke, the said coil being inactive during the retraction of said part.

3. In an apparatus of the character described, the combination of a normally inactive magnet coil and an armature therefor, a reciprocating part to which said armature is connected, a releasable device for engaging and holding said part in retracted position, manual means for releasing said holding device, means for closing the circuit for the magnet coil after the said part has been released from the holding device for effecting its working stroke, and means for retracting said reciprocating part, said retracting means being inactive during the working stroke thereof.

4. In an apparatus of the character described, the combination of a normally inactive magnet coil and an armature therefor, a reciprocating part to which said armature is connected, a releasable device for engaging and holding said part in retracted position, manual means for releasing said holding device, means for closing the circuit for the magnet coil after the said part has been released from the holding device for effecting its working stroke, and electrical means for retracting said reciprocating part, said means being inactive during the working stroke thereof.

5. In an apparatus of the character described, the combination of a normally inactive magnet coil and an armature therefor, a reciprocating part to which said armature is connected, a releasable device for engaging and holding said part in retracted position, manual means for releasing said holding device, and means for closing the circuit for the magnet coil after the said part has been released from the holding device for effecting its working stroke and means comprising a coil operating on said armature to retract said reciprocating tool.

6. In a tool reciprocating means, the combination with a reciprocating part, a magnet coil for effecting the working stroke of said reciprocating part, a magnet coil for retracting said reciprocating part, means releasable at will for holding said reciprocating part in retracted position, switching mechanism controlling said coils and means operated by said reciprocating part for actuating said switching mechanism.

7. In a tool reciprocating means, the combination with a reciprocating part, of a magnet coil for retracting said part, releasable means for securing said part in retracted position, a magnet coil effecting the working stroke of said part, a switching mechanism for controlling said coils comprising a switch arm, tappets upon said reciprocating part and means whereby said tappets operate said switch arm, one of said tappets being so adjusted as to throw said switch arm into neutral position when said reciprocating part approaches its retracted position and another of said tappets being so adjusted as to move said switch arm to close the circuit of the retracting coil when said reciprocating part is at the end of its working stroke.

8. In a tool reciprocating means, the combination with a reciprocating part, of releasable means for holding said part in retracted position, a magnet coil for effecting the working stroke of said part, switching mechanism for controlling said coil and a common means for releasing said releasable means, and operating said switch mechanism to control said coil.

9. In a tool reciprocating means, the combination with a reciprocating part, of releasable means for holding said part in retracted position, a magnet coil for effecting the working stroke of said part, switching mechanism for controlling said coil and a common manually operated means for releasing said releasable means, and operating said switch mechanism to control said coil.

10. In a tool reciprocating means, the combination with a reciprocating part, of means releasable at will for holding said part in retracted position, a magnet coil for retracting said part, a second magnet coil for effecting the working stroke of said part, switching mechanism for controlling said coils, means actuated by said reciprocating part for operating said switching mechanism to open the circuit of said second magnet coil and close the circuit of the retracting coil, when the reciprocating part is at the end of its working stroke, and to open the circuit of the said retracting coil when the reciprocating part is near its retracted position, manually operated means for releasing the means for holding the reciprocating part in retracted position and means operated by said manually operated means for moving the said switch mechanism into position to close the circuit of said second magnet coil.

11. In a tool of the class described, the combination with a reciprocating part, of releasable means for supporting said part in retracted position, electrical means for effecting the working stroke of said part including a switch, manual means for operating said supporting means to release the reciprocating part, and automatically operated mechanical means for closing and opening said switch.

12. In a tool of the class described, the combination with a reciprocating part, of releasable means for supporting said part in retracted position, electrical means for effecting the working stroke of said part including a switch, manual means for operating said supporting means to release the reciprocating part, and mechanical means automatically operated by said manual operating means and said reciprocating part for closing and opening said switch at the opposite ends of movement of said part.

13. In a reciprocating tool mechanism, the combination with a reciprocating part arranged to move vertically, of a magnet coil for effecting the working stroke of said part, a spring operated device for releasably supporting said part in retracted position, and means for energizing said coil after the release of said supporting device.

In testimony whereof I affix my signature, in the presence of two witnesses.

HARRY B. WHITE.

Witnesses:
JOHN KOEHN,
CHAS. M. BALL.